US00RE36009E

United States Patent [19]

Shultz

[11] E Patent Number: Re. 36,009

[45] Reissued Date of Patent: Dec. 29, 1998

[54] APPARATUS AND METHOD FOR REMOVING BEARINGS

[76] Inventor: William E. Shultz, 239 N. Main St., Lombard, Ill. 60148

[21] Appl. No.: 208,688

[22] Filed: Mar. 11, 1994

Related U.S. Patent Documents

Reissue of:

[64] Patent No.: 5,255,435
Issued: Oct. 26, 1993
Appl. No.: 960,726
Filed: Oct. 14, 1992

[51] Int. Cl.[6] ..... B23P 19/04

[52] U.S. Cl. ..... 29/898.08; 29/259; 29/263; 29/426.5

[58] Field of Search ..... 29/256, 258, 259, 29/263, 265, 898.08, 426.5

[56] References Cited

U.S. PATENT DOCUMENTS 3,611,540 10/1971 Gibu ..... 29/263
3,887,989 6/1975 Maynard ..... 29/898.08
4,339,865 7/1982 Shultz ..... 29/255 X
4,724,608 2/1988 Parrott ..... 29/259 X
4,852,235 8/1989 Trease et al. ..... 29/263

FOREIGN PATENT DOCUMENTS 256624 11/1963 Australia .

*Primary Examiner*—S. Thomas Hughes
*Attorney, Agent, or Firm*—Marshall, O'Toole, Gerstein, Murray & Borun

[57] ABSTRACT

Apparatus and method for removing a bearing. More particularly, the apparatus and method are designed to simplify the removal and replacement of all bearing cups and cones in an automotive automatic transmission. The apparatus includes an elongate bearing drive shaft; an adjustably sized mandrel which includes one or more bearing drive shoulders; a mandrel spreader for adjusting the mandrel drive shoulder to a predetermined dimension; and a collar or clamp ring for limiting the mandrel to a maximum outer dimension surrounding an outer surface of the bearing, without substantial slippage, during the removal and insertion steps, in one embodiment.

21 Claims, 3 Drawing Sheets

FIG.2
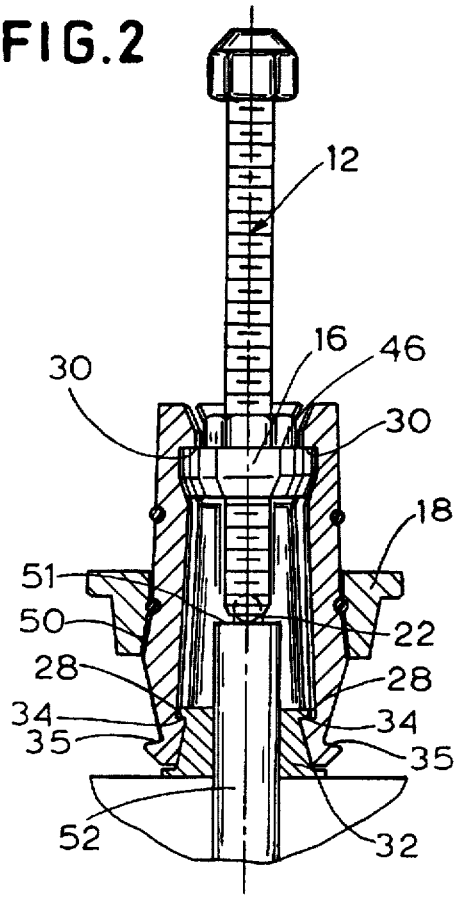
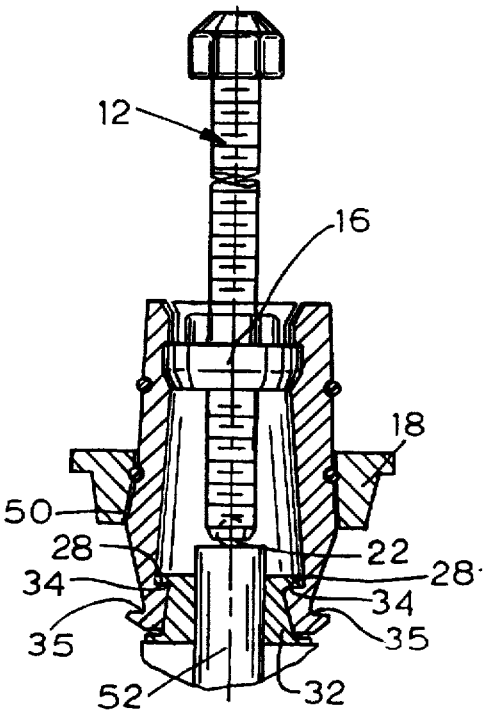
FIG. 2A
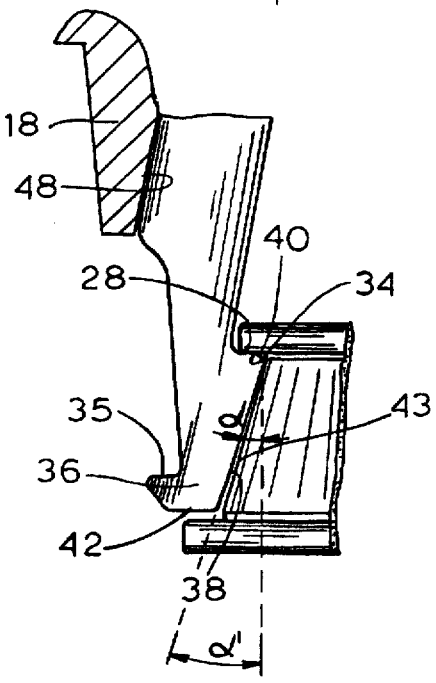
FIG.3
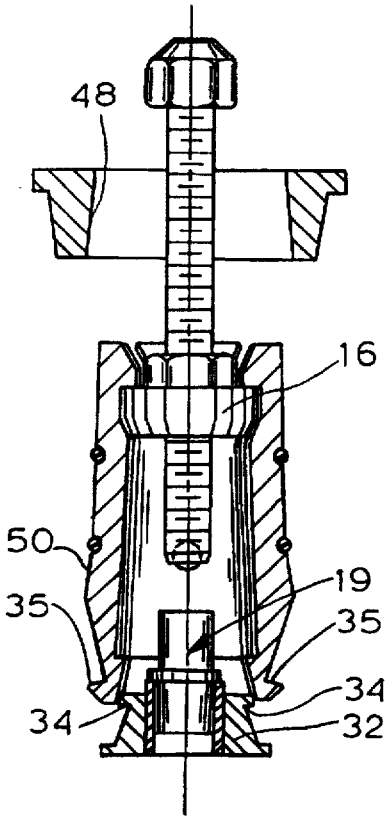
FIG. 4

APPARATUS AND METHOD FOR REMOVING BEARINGS

Matter enclosed in heavy brackets [ ] appears in the original patent but forms no part of this reissue specification; matter printed in italics indicates the additions made by reissue.

FIELD OF THE INVENTION

The present invention relates to a method and apparatus for removing bearings. More particularly, the present invention relates to a method and apparatus for removing bearings, such as automatic transmission bearing cones or bearing cups wherein the apparatus is adjustable to accommodate bearings of any size or diameter for removal by contacting the cup or cone on inner or outer surfaces thereof.

BACKGROUND OF THE INVENTION AND PRIOR ART

An automobile transmission includes a number of bearing cups and cones that carry rotating bearings. The rotating bearings can be removed easily with snips, leaving the bearing cup or cone, which is difficult to remove and replace because of other, closely oriented structure, such as a transmission case.

In the case of a transmission bearing cone or bearing cup, the cones and cups often times surround a transmission shaft that is very difficult and time consuming to remove and replace. Presently, tools are available for contact against an inner surface of bearings, including transmission cones, for removal and replacement after the transmission shaft is removed, such as disclosed in my U.S. Pat. No. 4,339,865. While such tools are extremely useful for removal and replacement of bearings when the inner diameter is unencumbered by a shaft or other transmission part, there exits a need in the transmission repair art, and generally, for a tool capable of removal of bearings, wherein an upwardly extending shaft or other mechanical device extends upwardly through the bearing cup or cone, by contacting the bearing cup or cone from an outer diameter, thereby eliminating the step of transmission shaft removal. Further, the apparatus of the present invention includes a pressure pad for insertion onto the structure that the bearing cone surrounds where there is no upwardly extending shaft or other mechanical part, so that the bearing cone can be removed over the pressure pad with the pressure pad in position. In another embodiment, the apparatus is designed to remove bearings by contact from an unencumbered internal diameter of the bearing cup.

Presently, bearings, such as automatic transmission bearing cups or cones, are removed by first removing an internally disposed transmission shaft so that the cone can be grasped from an inner diameter with a tool such as disclosed in U.S. Pat. No. 4,339,865; or the bearing cups and cones are removed very crudely, after shaft removal, by impacting the cup or cone with a hammer, sometimes after first heating the cup or cone with a torch to loosen the bearing from a surrounding transmission case.

In one embodiment, the present invention relates to a method and apparatus capable of bearing removal by contact of the bearing from an outer diameter so that internal parts, such as a transmission shaft, can remain in working position during the removal and replacement process. The apparatus is adjustable to accommodate bearings of various sizes and provides constant removal force around the entire periphery of the bearing for aligned removal without scoring internally disposed apparatus, such as an upwardly extending transmission shaft.

A patent to McCord, U.S. Pat. No. 2,646,619, describes a bearing removing tool which includes a plurality of bearing-contacting shoulders that are flexibly biased radially so that the shoulders can be initially disposed behind a bearing by compressing the shoulders radially to spread behind the bearing when the tool is inserted to the proper depth. Such a tool is inefficient because, depending upon the size of the bearing, the shoulders which should be flush against an annular bearing surface, and aligned to provide a maximum and non-slipping driving force, usually are not in full contact with the annular bearing surface. The driving shoulders of a tool such as that disclosed in the McCord patent have only a single unbiased diameter and therefore are flush against the bearing for removal only when the bearing is of the exact same diameter as that of the tool driving shoulders when manufactured. My prior U.S. Pat. No. 4,339,865 is incapable of removal or insertion of a bearing without insertion of the tool through an existing central open area in the bearing.

The apparatus of the present invention provides an adjustable bearing drive shoulder that, in one embodiment, is maintained in full contact with an outer surface of the bearing to be removed to provide maximum driving force, without slippage, and without removal of an internally disposed mechanism from its working position. In another embodiment, the apparatus is inserted into the bearing cup from an unencumbered internal diameter and spread to any desired diameter, for bearing cup removal, by threadedly raising a lower inverted cone that is carried on a driving shaft and disposed under the bearing cup.

SUMMARY OF THE INVENTION

In brief, the apparatus of the present invention includes an elongate bearing driving shaft; an adjustably sized mandrel, which includes one or more bearing drive shoulders; a mandrel spreader for adjusting the spacing between mandrel drive shoulders to provide drive shoulders having essentially any desired dimension; and a tapered collar insertable over the adjustable mandrel, in one embodiment, to maintain a tight fit of the mandrel drive shoulder against an outer surface of the bearing during removal; and in another embodiment including a tubular structure fitting loosely about the mandrel to provide an upper drive surface to threadedly pull a lower, inverted cone-shaped member into a lower center of the mandrel, thereby uniformly spreading outer mandrel drive shoulders against a lowermost annular surface of the bearing cup and thereafter lift the bearing cup out of its working position.

Accordingly, one aspect of the present invention is to provide a new and improved method and apparatus capable of removing bearings of any size by contact against an outer diameter of the bearing.

Another aspect of the present invention is to provide a new and improved apparatus including size adjustable bearing drive shoulders capable of being expanded to any desired size and maintaining flush contact against an outer or lowermost surface of a bearing, for removal.

Another aspect of the present invention is to provide an apparatus for removing bearings including a removable tapered collar capable of surrounding an adjustable mandrel to maintain a constant contact of an adjustable mandrel shoulder against an outer surface of the bearing for removal while maintaining the bearing in constant axial alignment with a driving shaft during removal.

Still another aspect of the present invention is to provide an apparatus and method for removal of a mechanical bearing including an expandable mandrel having adjustable bearing drive shoulders, and including a driving (removing) shaft that threadedly carries a tapered cone upwardly into the mandrel, from a bottom end of the mandrel, to spread the mandrel drive shoulders against a lowermost annular, planar surface of the bearing. Thereafter, further rotation of the driving shaft lifts the bearing out of position for complete removal.

These and other aspects, features and advantages of the present invention will be apparent to those of ordinary skill in the art in view of the detailed description of the preferred embodiments, made with reference to the drawings, a brief description of which is provided below.

BRIEF DESCRIPTION OF THE DRAWINGS

FIG. 2 is a partially elevated side view of the apparatus of FIG. 1, showing the apparatus secured around an outer periphery of a bearing cone (after removal of the rotatable bearings from the cone), and in position for removal of the bearing cone, while maintaining a centrally disposed transmission shaft in working position;

FIG. 2A is a view similar to FIG. 2, showing the bearing cone during removal;

FIG. 3 is a partially broken away elevated view of a portion of a single mandrel segment showing the contact of the mandrel segment shoulder against an upper, outer shoulder of a bearing cone during removal with the apparatus of FIG. 1;

FIG. 4 is a partially elevated side view showing the apparatus of FIGS. 1 and 2 during spreading of the mandrel segments to surround the outer bearing cone surface, after a pressure pad has been inserted internally within and extending upwardly from structure that the bearing surrounds to simulate an internal shaft (when no shaft is found extending upwardly from the bearing cone), prior to fitting the mandrel drive shoulders under the upper outer shoulders of the bearing cone.

DETAILED DESCRIPTION OF THE PRESENT INVENTION

Figure 1:
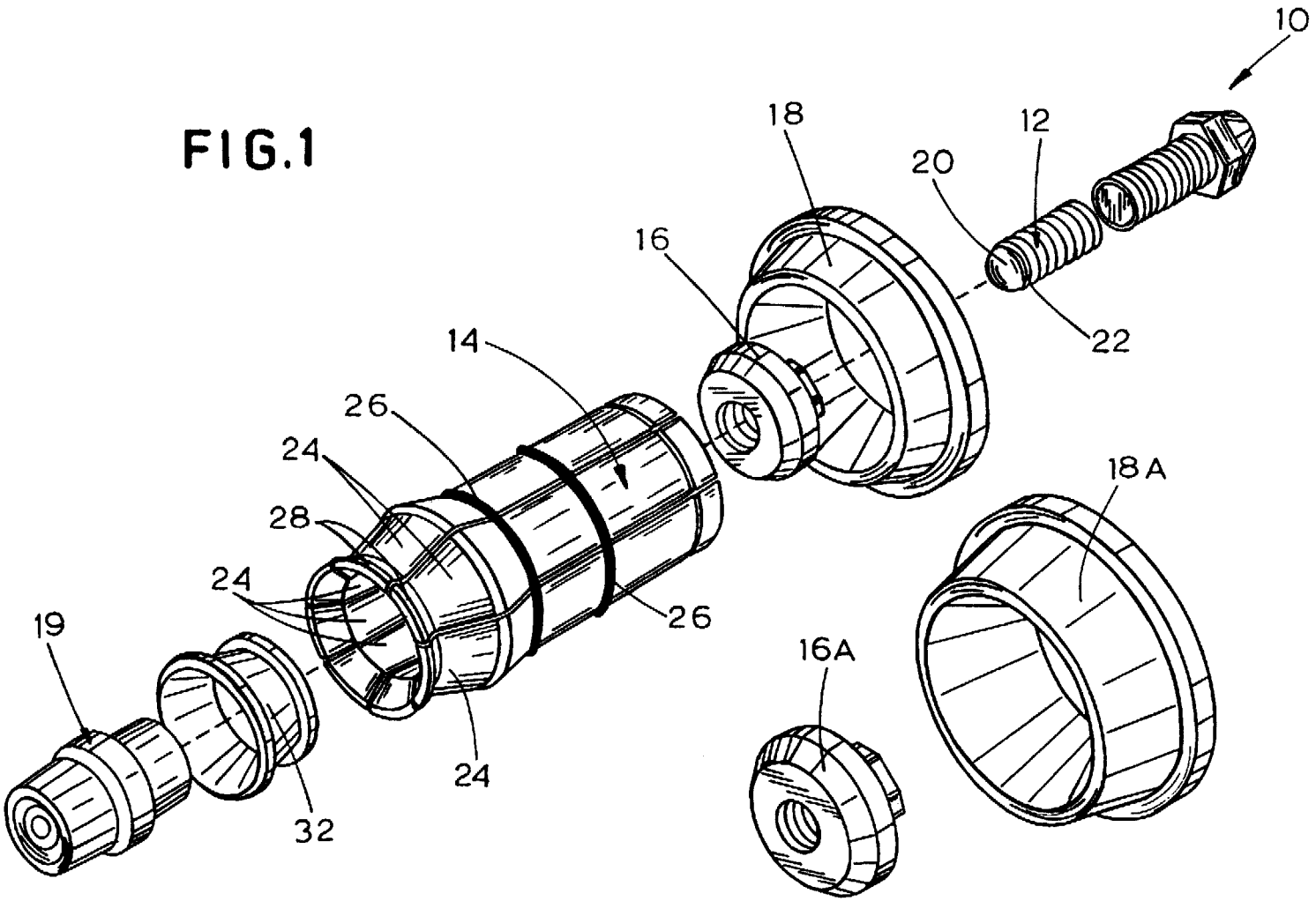
FIG. 1 is a partially exploded, perspective view of the apparatus of one embodiment of the present invention.

Turning now to FIG. 1, the apparatus of the present invention is generally designated by reference numeral 10. The apparatus includes an elongate driving shaft, generally designated by reference numeral 12; a bearing driving mandrel, generally designated by reference numeral 14; an internally threaded mandrel spreader generally designated by reference numerals 16 or 16A; and a mandrel securing collar, generally designated by reference numeral 18 or 18A. A bearing pad, generally designated by reference numeral 19, is provided to fit within, and upwardly extending from structure that the bearing surrounds, whenever there is no upwardly extending device, such as transmission shaft 52. Preferably, the elongate driving shaft 12 includes a ball bearing 20 freely rotatable about, and extending outwardly from, a transmission-contacting threaded end 22 of the driving shaft 12.

The mandrel 14 is formed from a plurality of annular segments 24 expandably held together, as shown in FIG. 1, with a plurality of elastomeric O-rings 26. The mandrel 14 also includes a planar, lower bearing-contacting removal shoulder 28 and a planar upper mandrel spreader-contacting removal shoulder 30 on each expandable segment to transmit force from the driving shaft 12 through the mandrel spreader 16 to shoulders 28 and 30 against an upper, outwardly extending annular bearing cone shoulder 34, for removal of a bearing, such as transmission bearing cone 32.

In accordance with an important feature of one embodiment of the present invention, each bearing-contacting shoulder 28 of each mandrel segment 24 extends inwardly from an internal surface of each spreader segment 24 for contact against an outer shoulder 34 of transmission cone 32, as shown in FIG. 2.

Figure 5:
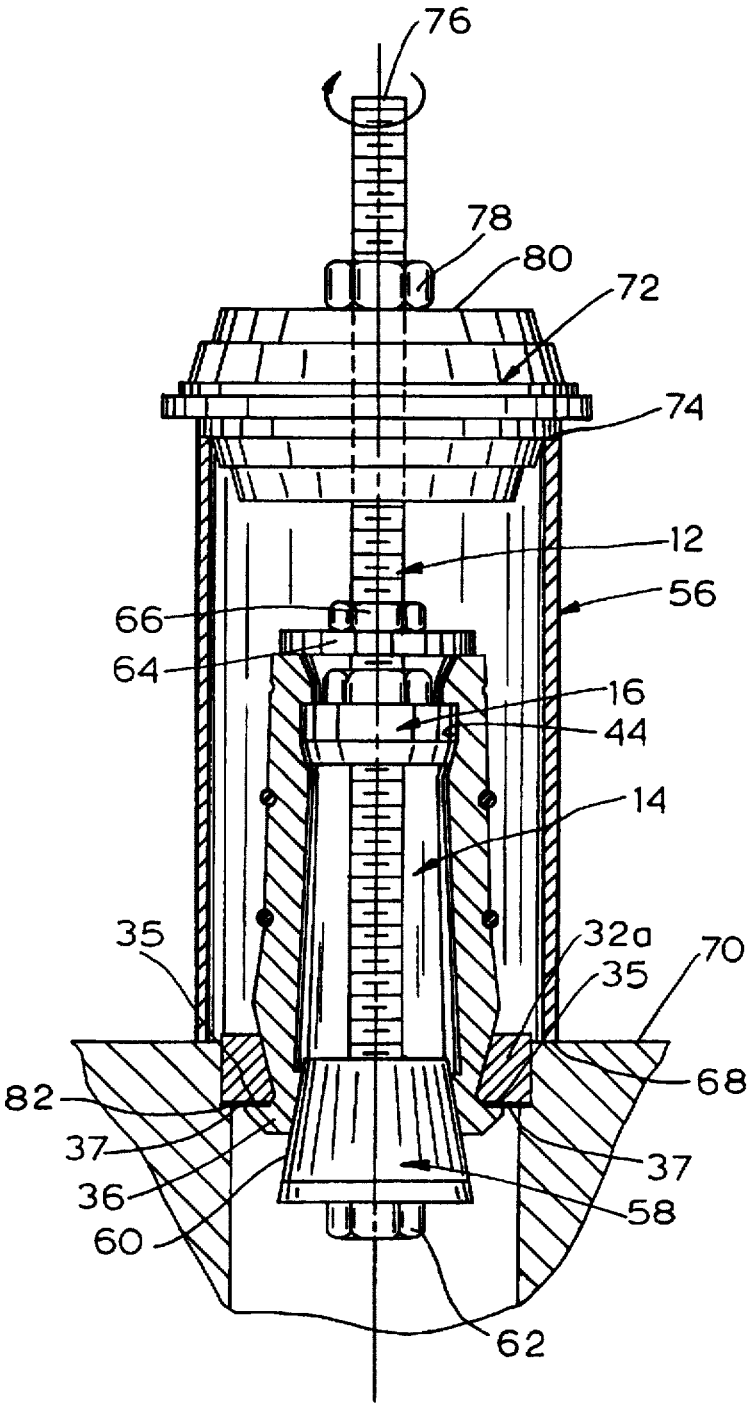
FIG. 5 is a partially elevated side view of another embodiment of the apparatus of the present invention used to remove a bearing by contact on an undersurface thereof after insertion through an internal diameter in the bearing.

In accordance with another important embodiment of the present invention, for removal of bearings by contact from an unencumbered internal diameter, the mandrel spreader segments 24 include a plurality of outwardly extending shoulders 35, outwardly extending from lower, outer surfaces of the mandrel segments 24, for contact against a lowermost planar surface 37 of the bearing cup 32A, as shown in FIG. 5, and explained in more detail hereinafter.

For bearing cone removal, as shown in FIGS. 2–4, the mandrel spreader 16 is threadedly disposed over the lower end 22 of driving shaft 12 for initially spreading the segments 24 about the internally disposed spreader 16, thereby outwardly extending the lower spreader segment internal drive shoulders 28 sufficiently to easily slide all segments 24 downwardly over the upper bearing cone shoulders 34 to interfit segment shoulders 28 under upper bearing cone shoulder or lip 34, and the segments are then tightened for flush engagement, as shown in FIG. 3. As best shown in FIG. 3, an upper portion of the segments 24 of the mandrel 14 are spread radially outwardly with mandrel spreader 16, and a lower, bearing-contacting portion of the segments 24 are compressed against an outer diameter of the cone 32, with tapered collar 18, for flush contact of shoulders 28 against the inwardly projecting annular bearing cone shoulder or lip 34. The tapered collar 18 tapered at 2°–10° from vertical, downwardly and outwardly, is forced downwardly over an outer diameter of the segments 24, to surround the mandrel 14, at a position lower than spreader 16 to lock the shoulders 28 and 34 together. The collar 18 is slid over the outside of mandrel 14 so that a bearing-contacting end 36 of each mandrel segment 24 is held tightly against the outer surface of bearing cone 32, as best shown in FIG. 3.

In accordance with another important feature of the present invention, the shoulders 28 extending inwardly from each segment 24 of the mandrel 14 (FIG. 2) are essentially planar and lie substantially horizontal (±20°) when in working contact with bearing cone shoulder 34, as best shown in FIG. 3. Further, the lower end 36 of each mandrel segment 24 includes a tapered inner segment wall 38 extending downwardly from an innermost surface 40 of shoulders 28, tapered outwardly and downwardly (as best shown in FIG. 3) to an essentially horizontal lowermost surface 42, for relatively flush contact of segment drive shoulder 28 against upper bearing cone shoulder or lip 34 for removal without interference from tapered outer bearing cone surface 43. The angle $\alpha$ of tapered outer bearing cone surface is usually about 15°±5° and the angle $\alpha'$, defining the outer taper on the spreader segments (FIG. 3) should correspond, e.g., 10°–20° for best contact of the segment shoulders against the undersurface 34 of the upper bearing lips. The angle $\alpha'$ on the spreader segments preferably is at least 2° greater in taper than $\alpha$.

When a bearing is being removed, in the embodiment shown in FIGS. 2–4, the mandrel spreader 16 is slid into a spreader-receiving slot or groove 44, formed in an upper portion of each spreader segment 24, thereby spreading the bearing-contacting end 36 of each mandrel segment sufficiently for engagement with mandrel segment shoulders 28, under the outer cone shoulder 34, for removal of cone 32. To provide force transmittal from the threaded driving shaft 12 to the internal lower segment drive shoulders 35, each segment 24 includes an upper, internal, planar surface forming internal shoulder 30, for contact against an upper, planar surface 46 on each mandrel spreader 16. At this point, the driving shaft 12 carrying threaded mandrel spreader 16, together with the mandrel 14, in position over the spreader 16, are together dropped into position such that bearing-contacting end 36 of each mandrel segment 24 is in position with segment shoulders 28 under bearing cone shoulder 34, as shown in FIG. 3. The driving shaft 12 then is rotated to elongate the shaft 12 into the mandrel 14 with ball bearing 20 in contact with an upper end 51 of transmission shaft 52.

In accordance with an important feature of the embodiment shown in FIGS. 2–4, a tapered cylindrical collar 18 is slid over an exterior of mandrel 14 to compress and maintain the spreader segments 24 against an exterior of the cone 32, with mandrel segment shoulders 28 disposed directly beneath the exterior cone shoulder 34, as shown in FIGS. 2 and 3. As shown in FIGS. 2–4, the collar 18 includes a downwardly and outwardly tapered internal surface 48 for compression against an outwardly extending lower, downwardly and outwardly tapered outer surface portion 50 of each spreader segment 24.

In accordance with a preferred embodiment, as shown in FIG. 2, the rotating bearing 20, rotatably mounted within the shaft end 22, contacts an upwardly extending end 51 of transmission shaft 52. Shaft 12 can be threadedly adjusted vertically by rotating shaft 12 so that, after mandrel spreading, the shaft 12 is extended toward transmission shaft end 51 for engaging the ball bearing 20 of driving shaft 12 against the upper surface 51 of transmission shaft 50, or shaft-simulating pressure pad 19 (FIG. 4), after alignment of mandrel segment shoulders 28 directly beneath bearing annular cone shoulder 34. After insertion of tapered collar 18 to surround the mandrel 14, the driving shaft 12 is rotated with respect to mandrel spreader 16, as shown in FIG. 2, thereby contacting the upper spreader surface 46 against the upper segment shoulders 30. Thereafter, further rotation of driving shaft 12 raises all mandrel segments 24 in unison by contact of upper mandrel segment shoulders 30 against the upper, planar surface 46 of spreader 16. The vertical lifting of the mandrel segments 24, in alignment, and in unison, raises the bearing cone 32 via upward force applied by segment shoulders 28 against the cone shoulder 34 for complete removal of the bearing cone 32.

A plurality of differently sized mandrel spreaders 16, 16A are provided for spreading the mandrel segments 24 to different diameters to accommodate different diameter bearing cones 32. It is to be understood that a single spreader, having a plurality of different diameter annular surfaces, or a plurality of mandrel spreaders of different outer diameters can be provided. FIG. 1 shows the disposition of the mandrel 14 prior to being spread by mandrel spreader 16 while FIGS. 2 and 4 show the disposition of the mandrel 14 when spread by the mandrel spreader 16. The elastomeric O-rings 26 of mandrel spreader 16 maintain the segments 24 of mandrel 14 evenly spaced when spread. Once the bearing is removed, the tapered collar 18 is removed to allow outward movement of the ends 36 of each mandrel segment 24 so that bearing cone 32 can be removed from the mandrel 14. One or more mandrel segments 24 can be added or removed while maintaining the segments 24 in generally annular alignment to accommodate interfitting about larger or smaller diameter bearing cones 32, respectively.

Referring now to FIG. 5, in accordance with this embodiment of the present invention, the apparatus shown in FIG. 1, with some modifications or additions, is used to remove a bearing, such as bearing cup 32A that has an unencumbered internal diameter, by contacting the planar, annular undersurface 37 of the bearing cup 32A after insertion of the mandrel 14 through the unencumbered internal diameter, for contact of outwardly extending mandrel drive shoulders 35 against the bearing cup undersurface 37. In the embodiment shown in FIG. 5, the same mandrel 14, including the same plurality, e.g., 5 to 7, mandrel segments 24 and the same one or more mandrel spreaders 16, 16A are used to initially position the mandrel segments 24 in position for contact of the outer segment shoulders 35 against the annular undersurface 37 of the bearing cup 32A. In this FIG. 5 embodiment, however, the lower end 36 of the mandrel segments 24 contact the bearing cup 32A from an internal diameter, without a transmission shaft 52 and without a pressure pad 19, since the central opening within the bearing cup 32A must be free for insertion of the mandrel 14 therein. Additional structure, including a loosely fitting tubular structure 56, and an inverted truncated cone 58, threadedly received on the lowermost end 22 of driving shaft 12, are included for spreading the mandrel segments 24 into working position, as shown in FIG. 5, and to provide a thrust transmitting bearing surface to lift the bearing cup 32A upwardly and evenly out of position, as will be explained in more detail hereinafter.

As shown in FIG. 5, when a bearing is being removed from an internal diameter, the inverted cone 58, having an evenly-tapered outer surface 60 tapered upwardly and inwardly from a lower integral hex nut 62, is threaded over the lowermost driving shaft end 22 for spreading the mandrel segments 24 from the lower ends 36 thereof. Like the FIGS. 2–4 embodiments, the mandrel spreader 16 is slid into a spreader-receiving slot or groove 44, formed in an upper portion of each spreader segment 24, thereby providing a fulcrum on outer surfaces of spreader 16 over which the spreader segments can be compressed inwardly, from their lowermost ends, to fit the lower ends 36 of the mandrel segments 24, and the cone 58, centrally within the internal diameter of the bearing cup 32A from the upper surface thereof. After disposing the cone 58 and all outwardly projecting segment shoulders 35 vertically beneath the lowermost bearing cup undersurface 37, driving shaft 12 is rotated, through a washer 64 and upwardly contacting threaded member, e.g., nut 66, to raise the inverted cone 58 with respect to the mandrel 14, thereby forcing the inverted cone 58 upwardly between the lower ends 36 of the mandrel segments 24 to spread all mandrel segments 24 and seat upper, planar surfaces of mandrel shoulders 35 against the lower, planar shoulders or surfaces 37 of the bearing cup 32A.

To provide force transmittal from the threaded driving shaft 12 to the outwardly extending lower segment drive shoulders 35, the loosely fitting tubular member 56 is disposed around the outer diameter of the bearing cup 32A so that a lowermost annular tubular member surface 68 contacts bearing-surrounding structure, such as transmission case 70. A washer 72 having an axial, central aperture larger than the outer diameter of driving shaft 12, is disposed over an upper annular surface 74 of tubular member 56 and over an upper end 76 of driving shaft 12. Threaded nut 78 then is threaded downwardly over upper end 76 of driving shaft 12 against an upper planar surface 80 of the washer 72. At this point, the driving shaft 12 carrying threaded mandrel spreader 16, together with the mandrel 14 in position over the spreader 16, and carrying the inverted cone 58, are in position for lifting the bearing cup 32A out of the transmission case 70 or other surrounding structure. Further rotation of nut 78, with a wrench (not shown) will raise segment shoulders 35, and bearing cup 32A for complete and even aligned removal of bearing cup 32A, and any shim 82 thereunder, in tact with the cup 32A.

Many modifications and variations of the present invention are possible in light of the above teachings. Thus, it is to be understood that, within the scope of the appended claims, the invention may be practiced other than as specifically described above.

What is claimed and desired to be secured by Letters patent of the United States is:

What is claimed is:

1. Apparatus for removing a bearing without removal of an internal mechanical part comprising:

an elongate bearing driving shaft;

contacting means for contacting an annular outer bearing surface, said contacting means having a tapered outer surface and including a bearing-contacting shoulder, said contacting means being connected to said elongated driving shaft when operatively assembled for removing a bearing;

adjusting means for adjusting said bearing driving shoulder to a desired dimension to contact at least a portion of said annular outer bearing surface; and maintaining means for maintaining said bearing contacting shoulder in engagement with said outer bearing surface, said maintaining means having a tapered inner surface for contact against said tapered outer surface of said contacting means.

2. Apparatus as defined in claim 1, wherein said contacting means comprises a plurality of segments expandably connected, at least two of said segments including a bearing driving shoulder for contacting an outer annular surface of a bearing.

3. Apparatus as defined in claim [1] *2*, wherein said segments are expandably connected by an expandable elastomeric material.

4. Apparatus as defined in claim 2, wherein said maintaining means comprises a tubular ring having dimensions closely corresponding to an other diameter of said segments, wherein said segments are expanded to surround said outer surface of said bearing, with said driving shoulders engaging said bearing on opposite outer surfaces.

5. Apparatus as defined in claim 1, wherein said elongate driving shaft includes an end surface adapted for contact with a mechanical part disposed within and upwardly extending from said bearing.

6. Apparatus as defined in claim 5, wherein said driving shaft end includes a rotatable bearing extending outwardly therefrom.

7. Apparatus as defined in claim 2, wherein said adjusting means comprises an annular collar mounted on said driving shaft along a longitudinal axis of said annular collar, said collar adapted for insertion between said segments, and longitudinally adjustable on said driving shaft.

8. Apparatus as defined in claim 7 including a plurality of exchangeable collars, each separately mountable to surround said driving shaft to expand said segments to a plurality of dimensions.

9. Apparatus for removing a bearing comprising:

an elongate bearing driving shaft;

contacting means for contacting an outer annular bearing surface, said contacting means having a tapered outer surface and including a bearing-contacting drive shoulder, said contacting means being connected to said driving shaft when operatively assembled for removing a bearing;

means for adjusting said bearing drive shoulder to a desired dimension to contact at least a portion of an annular bearing outer surface;

means for applying a removing force to said outer annular bearing surface through said bearing-contacting shoulder; and clamp means for clamping said drive shoulder against said outer bearing surface, said clamp means having a tapered inner surface for contact against said tapered outer surface of said contacting means.

10. Apparatus as defined in claim 9, wherein said clamp means comprises a tubular member adapted to surround said contacting means to prevent further expansion of said contacting means.

11. A method of removing a bearing in a device comprising:

expanding an expandable mandrel by inserting a mandrel expansion collar within the expandable mandrel, said expansion collar being threadedly mounted on a driving shaft and having an upper surface in contact with an interior drive shoulder within said mandrel;

disposing the mandrel about the exterior of the bearing so that one surface of said bearing is in contact with a driving shoulder of said mandrel;

compressing a lower portion of the mandrel to clamp the mandrel about the exterior of the bearing to secure the mandrel drive shoulder under an outwardly extending lip of said bearing;

threadedly extending said driving shaft within said mandrel so that a mandrel-received end of said driving shaft contacts a mechanical part extending upwardly from a longitudinal axis of said bearing;

continuing the extension of the driving shaft within the mandrel to lift the bearing upwardly, thereby removing the bearing from its seated position.

12. A method as defined in claim 11, wherein said mandrel is compressed by forcing a clamping means over an outer surface of the mandrel from an upper end of said mandrel.

13. A method as defined in claim 12, wherein the collar is removed after bearing insertion to collapse said mandrel for removal of the bearing from the mandrel.

14. Apparatus for removing a bearing without removal of an internal mechanical part comprising:

an elongate bearing driving shaft;

contacting means axially and internally insertable through said bearing for contacting an annular bearing undersurface, said contacting means including a bearing-contacting shoulder, said contacting means being connected to said elongate driving shaft when operatively assembled for removing a bearing;

a mandrel expansion collar threadedly carried on said driving shaft for expanding an upper portion of said contacting means;

[tapered] adjusting means for adjusting said bearing driving shoulder, from an undersurface thereof, to a desired dimension to contact at least a portion of said annular bearing undersurface; and thrust means for transmitting thrust from said driving shaft to said bearing drive shoulder such that rotation of said driving shaft forces said bearing undersurface upwardly for removal.

15. Apparatus as defined in claim 14, wherein said contacting means comprises a plurality of segments expandably connected, at least two of said segments including an outwardly extending bearing driving shoulder for contacting an annular undersurface of said bearing.

16. Apparatus as defined in claim 15, wherein said segments are expandably connected by an expandable elastomeric material.

17. Apparatus as defined in claim 14, wherein said thrust means comprises a tubular ring having dimensions loosely fitting outside of an outer diameter of said segments, and including a washer disposed over an upper annular surface thereof, said washer including a driving shaft receiving aperture axially positioned therein.

18. Apparatus as defined in claim 14, wherein said adjusting means comprises an annular collar mounted on said driving shaft along a longitudinal axis of said annular collar, said collar adapted for insertion between said segments, and longitudinally adjustable on said driving shaft.

19. Apparatus as defined in claim 18 including a plurality of exchangeable collars, each separately mountable to surround said driving shaft to expand said segments to a plurality of dimensions.

20. A method of removing a bearing in a device comprising:

inserting a mandrel expansion collar, threadedly carried on an elongate driving shaft, within an expandable mandrel to expand an upper end of said mandrel, said expansion collar being threadedly mounted on a driving shaft and having an upper surface in contact with an interior drive shoulder within said mandrel, said driving shaft carrying an inverted cone on a lower end thereof;

disposing the mandrel and cone within an interior of the bearing so that an annular undersurface of said bearing is in contact with a plurality of driving shoulders extending outwardly from said mandrel;

expanding said mandrel by threadedly raising said inverted cone upwardly into said mandrel to secure the mandrel drive shoulders under said bearing undersurface; and rotating said driving shaft to lift the mandrel drive shoulders to lift the bearing upwardly, thereby removing the bearing from its seated position.

*21. Apparatus for removing a bearing without removal of an internal mechanical part comprising:*

*an elongate bearing driving shaft;*

*contacting means axially and internally insertable through said bearing for contacting an annular bearing undersurface, said contacting means including a bearing-contacting shoulder, said contacting means being connected to said elongate driving shaft when operatively assembled for removing a bearing;*

*a mandrel expansion collar threadedly carried on said driving shaft for expanding an upper portion of said contacting means;*

*a mandrel spreader for adjusting said bearing driving shoulder, from an undersurface thereof, to a desired dimension to contact at least a portion of said annular bearing undersurface; and*

*thrust means for transmitting thrust from said driving shaft to said bearing drive shoulder such that rotation of said driving shaft forces said bearing undersurface upwardly for removal.*

* * * * *